(12) United States Patent
Skeens et al.

(10) Patent No.: US 6,634,384 B2
(45) Date of Patent: Oct. 21, 2003

(54) ONE-WAY VALVE FOR USE WITH VACUUM PUMP

(75) Inventors: Janet L. Skeens, San Carlos, CA (US); Gerald W. Sweeney, La Jolla, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/346,742

(22) Filed: Jan. 17, 2003

(65) Prior Publication Data

US 2003/0111121 A1 Jun. 19, 2003

Related U.S. Application Data

(62) Division of application No. 09/828,347, filed on Apr. 5, 2001.

(51) Int. Cl.[7] ................... F16K 15/14; B65B 31/06; B65D 30/24
(52) U.S. Cl. ............... 137/845; 137/843; 251/149.1; 206/524.8; 383/97; 383/103
(58) Field of Search .................. 137/512.15, 843, 137/845, 852, 907; 53/512; 99/472; 141/65; 206/524.8; 251/149.1, 149.7; 383/95, 97, 100, 103

(56) References Cited

U.S. PATENT DOCUMENTS

| | | | | |
|---|---|---|---|---|
| 4,337,804 A | * | 7/1982 | Maruscak | 141/65 |
| 4,584,182 A | | 4/1986 | Sanderson et al. | 422/310 |
| 5,121,590 A | | 6/1992 | Scanlan | 53/510 |
| 5,142,970 A | * | 9/1992 | ErkenBrack | 99/472 |
| 5,450,963 A | * | 9/1995 | Carson | 206/524.8 |
| 5,480,030 A | | 1/1996 | Sweeney et al. | 206/524.8 |
| 5,556,005 A | * | 9/1996 | Banks | 222/96 |
| 5,651,470 A | * | 7/1997 | Wu | 220/212 |
| 5,941,391 A | * | 8/1999 | Jury | 206/524.8 |
| 6,059,457 A | * | 5/2000 | Sprehe et al. | 383/63 |
| 6,070,397 A | * | 6/2000 | Bachhuber | 53/512 |

FOREIGN PATENT DOCUMENTS

| | | |
|---|---|---|
| GB | 856544 | 12/1960 |
| WO | WO 98/32670 | 7/1998 |

OTHER PUBLICATIONS

International search Report for the corresponding application PCT/US02/10383; dated Jul. 23, 2002.*

* cited by examiner

*Primary Examiner*—Michael Powell Buiz
*Assistant Examiner*—Ramesh Krishnamurthy
(74) *Attorney, Agent, or Firm*—Ostrager Chong & Flaherty LLP

(57) ABSTRACT

A valve assembly mounted in a resealable/reclosable storage bag. The valve assembly includes a base and a valve element. The valve element includes a stem with a convex cap attached at one end and a valve gate attached at the opposite end. The stem extends into a hole in the base. The resilient quality of the cap, acting against the top of the base, holds the gate against the bottom of the base, thereby forming a seal between the gate and the base that is strong enough to preserve the vacuum inside the bag. A cavity extends into the stem from the cap end. A hole in the stem runs from the cavity to outside the stem. When the stem is pressed down, a vacuum source may draw air between the gate and the base, through the hole in the stem, into the cavity, and subsequently outside the bag.

21 Claims, 4 Drawing Sheets

ONE-WAY VALVE FOR USE WITH VACUUM PUMP

RELATED PATENT APPLICATION

This application is a divisional of and claims priority from U.S. patent application Ser. No. 09/828,347 filed on Apr. 5, 2001.

BACKGROUND

1. Field of Invention

The present invention relates to evacuable storage containers, and in particular to air valves used in evacuable storage containers.

2. Related Art

Present evacuable food containers evacuate air from the container through the same opening through which food is placed into the container. Once the vacuum is established inside the container, the opening is permanently sealed. To access the container's contents, the container must be cut open. To reuse the container, air is evacuated through the newly cut opening, and the container is again permanently sealed. Unfortunately, the container becomes smaller each time the container is opened, evacuated, and resealed. Eventually the container becomes too small for use and must be discarded. The result is a considerable waste of material and money.

What is required, therefore, is a flexible, evacuable food container that may be reused without progressively destroying the container.

SUMMARY

A storage system includes a bag having a resealable/reclosable seal at an opening through which material is placed inside the bag. A valve assembly is mounted in a side of the bag. The bag is sealed and a vacuum source is used to draw air through the valve assembly, thereby creating a vacuum inside the bag. The vacuum inside the bag helps to preserve material or items stored inside the bag.

The valve assembly includes a base and a valve element. The valve element has a stem and a convex, resilient cap attached to the top of the stem. The bottom of the stem extends into a hole in the base and is kept from moving completely through the base by the distal rim or end of the cap. A valve gate is connected to the bottom of the stem via a neck portion of the stem. The resilient quality of the cap tends to pull the stem up through the hole in the base, thereby pulling the outer portion of the valve gate against the bottom of the base. The stem includes a cavity that extends into the stem from the top end. At least one hole connects the cavity to an outer surface of the stem so that air may pass through the hole, into the cavity, and then outside the stem.

To open the valve assembly, the top end of the stem is pressed down towards the base. The resulting downwards stem movement opens the seal between the gate and the bottom of the base. A conventional vacuum source may then draw air from the interior of the bag, between the gate and the bottom of the base, through the hole in the stem, and through the cavity to outside the bag. When the top end of the stem is released, the resilient quality of the cap again pulls the stem upwards and seals the gate to the bottom of the base.

DETAILED DESCRIPTION

Figure 1:
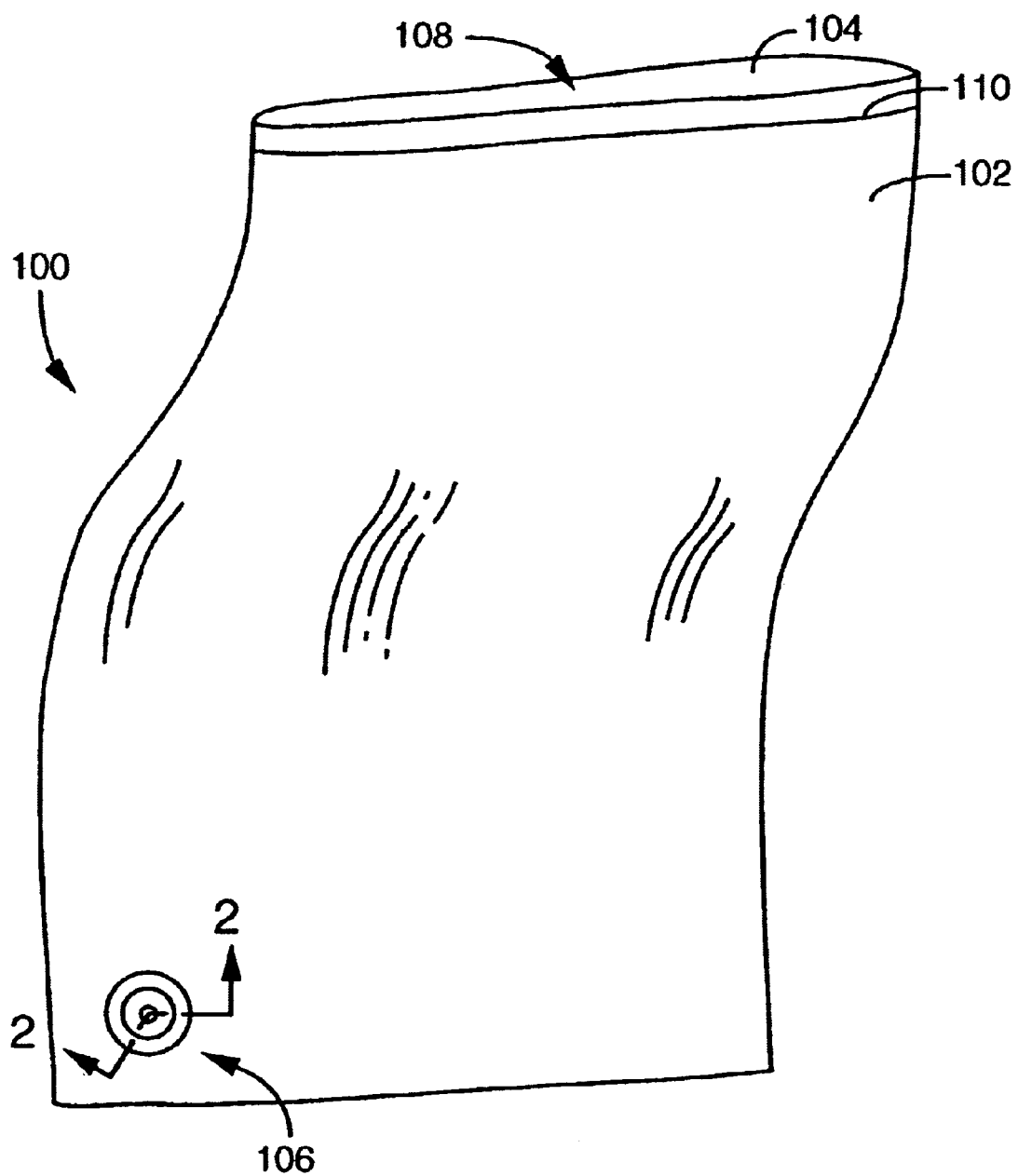
FIG. 1 is a front view of a storage bag having a valve assembly in accordance with the invention.

Identical reference numbers in the drawings accompanying the following description represent similar structures. The drawings are not necessarily to scale.

FIG. 1 is a front view of a storage system including a storage bag 100 in accordance with the invention. Bag 100 includes front sheet 102 and rear sheet 104 (hidden behind the front sheet) that are bonded at the sheet edges. Other bag or flexible container configurations may be used. Valve assembly 106, described in detail below, is mounted in front sheet 102 so that an airtight seal is formed between assembly 106 and sheet 102. Bag 100 also includes opening 108 between sheets 102 and 104. Reusable/reclosable zipper-type airtight seal 110 is positioned so that it may be opened, material (e.g., human-consumable food) may be placed into bag 100, and then seal 110 is closed to form an airtight seal between the interior and exterior of bag 100. In some embodiments, sheets 102 and 104 are made of material suitable for storing food for human consumption, such as polyethylene or nylon/polyethylene laminate. Seal 110 may be any reusable airtight seal, such as ones manufactured by the MINIGRIP® ZIP-PAK® division of ILLINOIS TOOL WORKS INC. (ITW), located in Glenville Ill.

Figure 2:
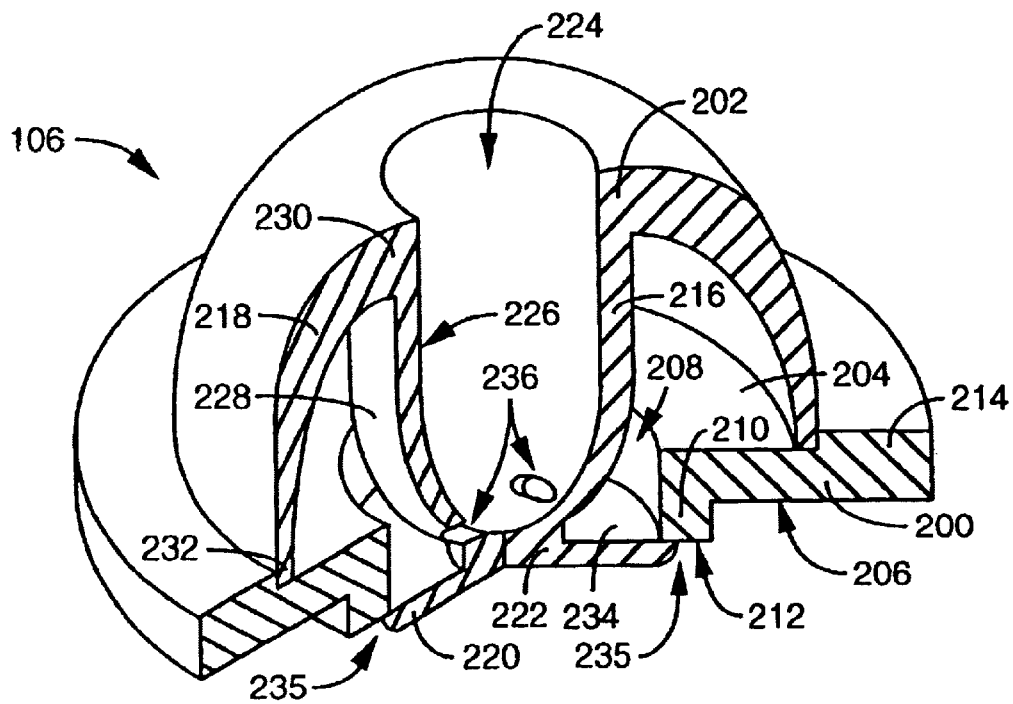
FIG. 2 is a cutaway perspective view taken along the cut line shown in FIG. 1.

FIG. 2 is a cutaway perspective view taken along the cut line shown in FIG. 1. Valve assembly 106 includes base 200 and valve element 202 mounted on base 200. Base 200 and valve element 202 are in some embodiments formed using conventional injection molding, and may be formed of material such as conventional polyethylene, polyvinylchloride (PVC), acrylonitrile-butadiene-styrene (ABS), or other material commonly used for forming such structures. Valve assembly 106 is assembled by pressing valve element 202 into base 200.

Base 200 includes a top surface 204, a bottom surface 206, and a hole 208 that extends through base 200. Annular valve seat 210 is formed on bottom surface 206, adjacent hole 208, and includes valve seat surface 212. Annular retaining lip 214 is formed on top surface 204. In some embodiments the diameter of hole 208 is approximately ⅜ inch and the diameter of base 200 is approximately 1 inch, although other sizes may be used. In some embodiments either or both seat 210 and lip 214 may be eliminated.

Valve element 202 includes stem 216, resilient, convex cap 218, valve gate 220, and stem neck 222. Cavity 224 is defined in stem 216 and is open at the top. Thus stem 216 has an inner surface 226 and an outer surface 228. In some embodiments the outer diameter of stem 216 is slightly smaller than the diameter of hole 208.

Cap 218 includes a middle portion 230 and a distal rim or end portion 232. Cap 218 is attached to stem 216 at middle portion 230. When cap 218 is assembled into base 200, distal portion 232 engages retaining lip 214. In some embodiments, however, lip 214 is omitted. Cap 218 is made of a resilient material, such as polyethylene, so that as stem 216 is forced down towards hole 208 the resilient quality of cap 218 tends to restore stem 216 up to its starting position. Valve gate 220 prevents stem 216 from moving too far out of hole 208.

Gate 220 is connected via neck 222 to the bottom of stem 216. The upward force from cap 218 holds surface 234 of gate 220 against valve seat face 212, thereby forming an airtight seal at 235. In some cases, gate 220 is formed as an integral part of element 202. In other cases, gate 220 is a separate piece, formed of a material different from element 202, which is conventionally joined to element 202.

In FIG. 2, two holes 236 (only one is required, but any number of holes may be used) are shown extending through stem 216 from cavity 224 to outer surface 228. When stem 216 is pressed down towards hole 208, holes 236 allow air to pass between gate surface 234 and seat face 212, and then into cavity 224.

Figure 3:
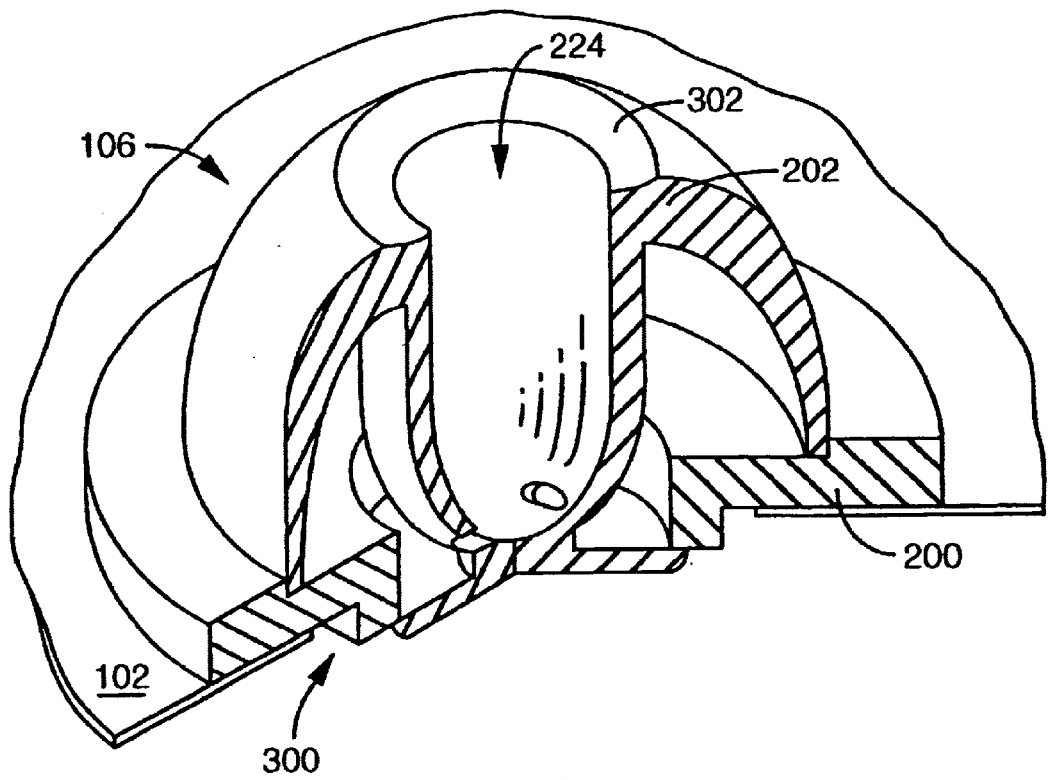
FIG. 3 is a cutaway perspective view showing another embodiment of the invention.

FIG. 3 is a cutaway perspective view showing another embodiment of the invention. As shown in FIG. 3, base 200 is mounted into hole 300 in sheet 102 of bag 100 (FIG. 1). In some embodiments base 200 is attached to sheet 102 using conventional thermal bonding, although other attachment methods such as adhesives may be used to form an airtight seal between sheet 102 and base 200.

FIG. 3 also shows annular beveled nozzle lip 302 formed around the top opening of cavity 224. In some embodiments lip 302 is sized to receive a nozzle from a vacuum source and helps prevent the nozzle from slipping off of valve element 202. Another advantage of lip 302 is that it may accommodate several different nozzle 400 diameters.

Figure 4:
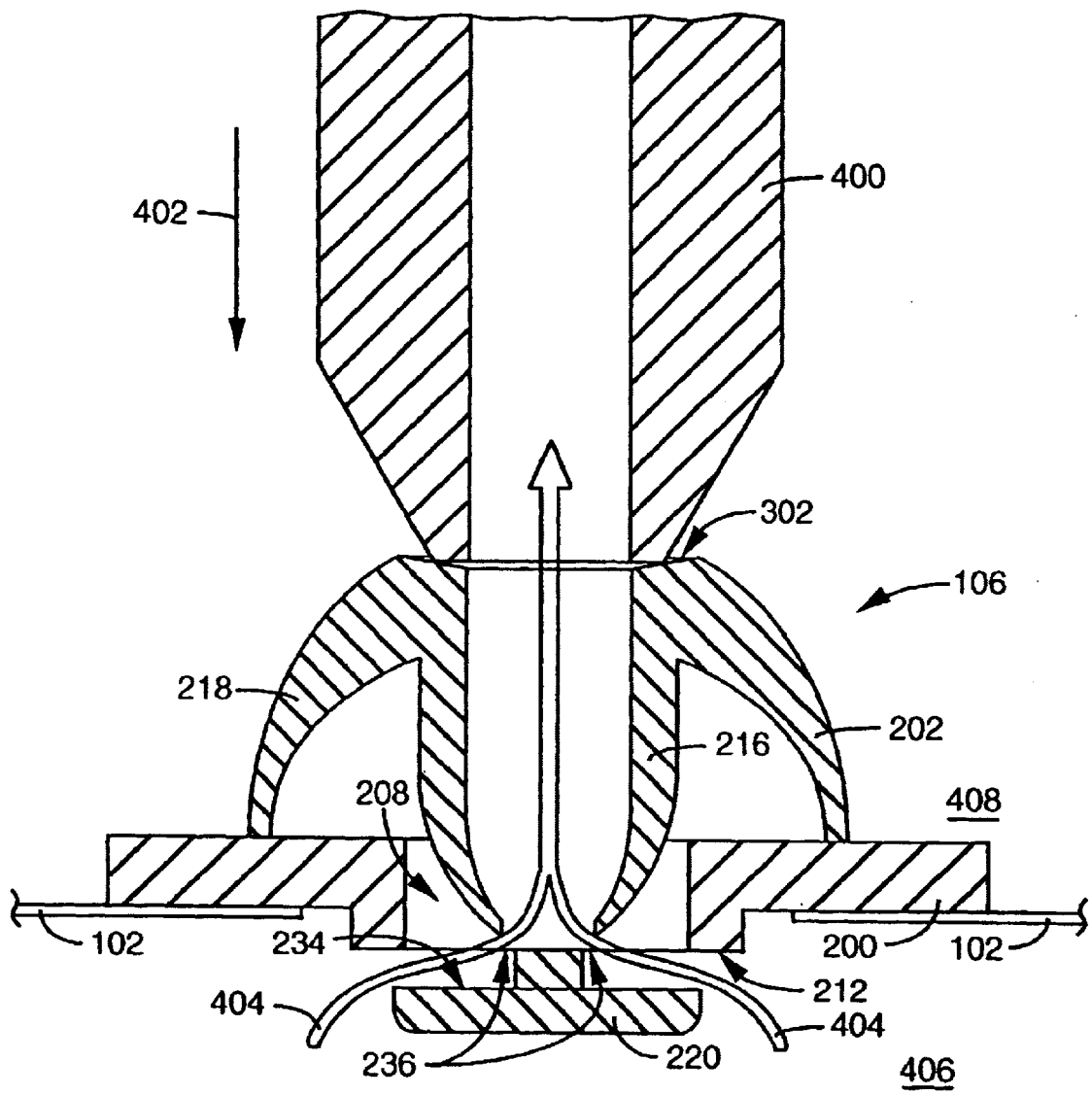
FIG. 4 is a cross-sectional view of another embodiment of the invention, illustrating valve operation.

FIG. 4 is a cross-sectional view of another embodiment of the invention, illustrating valve operation. As shown in FIG. 4, nozzle 400 is pressing down on valve assembly 106, as illustrated by arrow 402. The downward pressure from nozzle 400 pushes stem 216 farther into hole 208. As stem 216 moves downward, the airtight seal between surface 234 of valve gate 220 and valve seat face 212 is broken. Thus, a vacuum source (FIG. 5) connected to nozzle 400 draws air, illustrated by arrows 404, from the interior 406 to the exterior 406 of bag 100 (FIG. 1). When nozzle 400 is removed, the resilient force from cap 218 pulls gate 220 upwards and tightly holds surface 234 against face 212, again forming an airtight seal. The force from cap 218, acting against the top of base 200, is sufficient to overcome differential pressure between the interior 406 and exterior 408 of bag 100 after air has been removed from interior 406. The vacuum inside bag 100 is sufficient for preserving food.

The small size of the valve assembly, together with its ease of use by merely pressing to move the valve gate to the open position, is a particular advantage. This ease of use is advantageous for home use of the bag and valve assembly combination for food storage, since a food-grade vacuum can extend food shelf-life by three to five times or more. Food-grade vacuums are typically defined by local (e.g., state) health authority.

Figure 5:
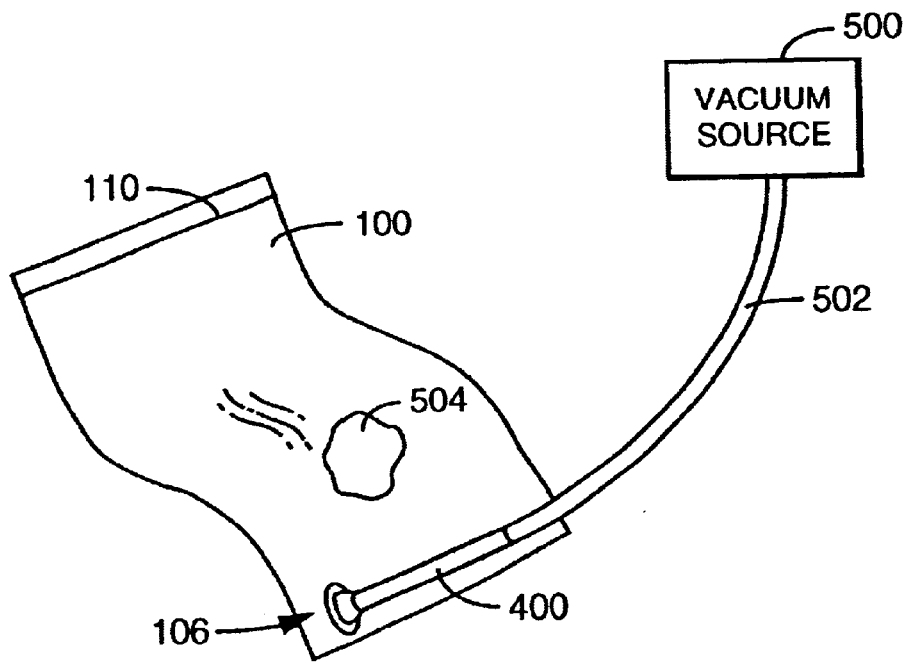
FIG. 5 is a perspective view illustrating an embodiment of the invention that includes a vacuum source.

FIG. 5 is a perspective view illustrating an embodiment of the invention that includes a vacuum source capable of drawing a food-grade vacuum. Conventional nozzle 400 is connected to conventional vacuum source 500 (e.g., a Fresh-Saver® Plus handheld electric piston pump, manufactured by Tilia, Inc., San Francisco, Calif.) via conventional flexible tube 502. In some embodiments, vacuum source 500 is a conventional hand-held vacuum pump. As shown in FIG. 5, a user has placed an item 504 into bag 100 and has closed airtight seal 110. The user then applies nozzle 400 against valve assembly 106. When valve assembly 106 opens, vacuum source 500 draws air from the interior of bag, thereby forming a vacuum inside bag 100. The vacuum inside bag 100 prevents air outside bag 100 from reaching item 504. Item 504 may be food or other material that is better preserved when kept from moisture or from the gasses in air.

Figure 6:
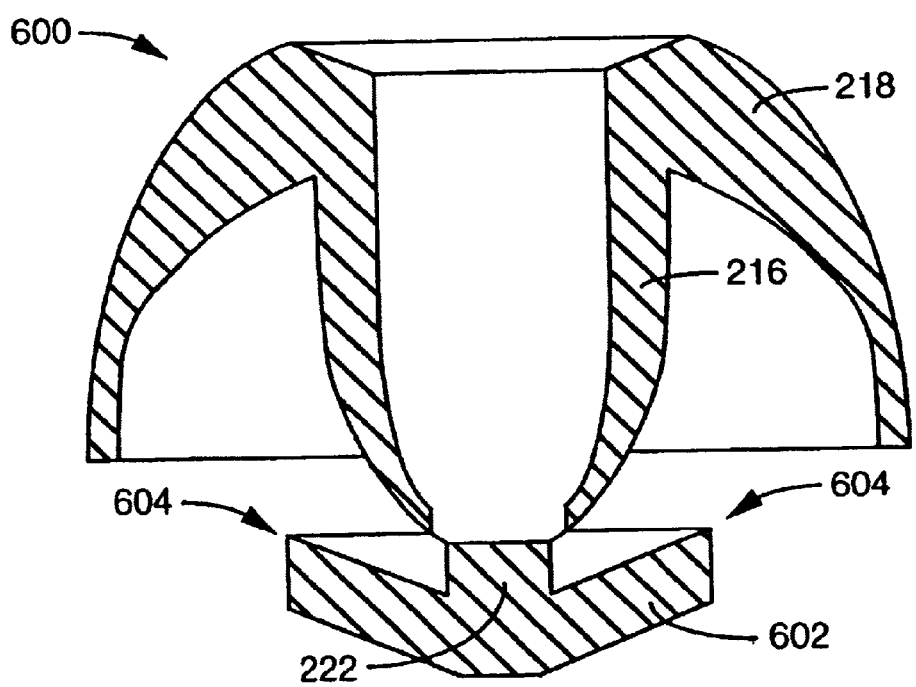
FIG. 6 is a cross-sectional view of another embodiment of a valve element.

FIG. 6 is a cross-sectional view of another embodiment of a valve element 600. As shown in FIG. 6, valve gate 602 is angled so that a seal will be formed by edge 604 against seat face 212 (FIG. 2) when element 600 is mounted in base 200.

Persons familiar with storage bag systems will understand that many variations of the described embodiments exist. The invention has been described above using specific embodiments. Therefore, the invention is not limited to the specific described embodiments, but is limited only by the following claims.

What is claimed is:

1. A valve assembly comprising a base having a hole therethrough and a contact surface disposed along a periphery of said hole, and a valve coupled to said base for opening said hole in a first state and closing said hole in a second state, said valve comprising a resilient cap disposed on one side of said base, a gate disposed on the other side of said base, and a stem connecting said cap to said gate, wherein said cap has an opening, said stem has a cavity in fluid communication with said opening in said cap and at least one opening in fluid communication with said cavity and an exterior of said stem, and said gate is configured to contact said contact surface of said base to close said hole in said base when said cap is in a first state and to separate at least partially from said surface to open said hole in said base at least partially when said cap is in a second state, said cap transitioning from said first state to said second state by deformation, said opening in said cap being in fluid communication with a space on said other side of said base via said opening in said stem and said cavity in said stem when said cap is in said second state.

2. The valve assembly as recited in claim 1, wherein said stem is integrally formed with a portion of said cap disposed along a periphery of said opening in said cap.

3. The valve assembly as recited in claim 1, wherein said stem comprises a neck that is integrally formed with or joined to a portion of said gate.

4. The valve assembly as recited in claim 1, wherein said hole in said base is generally circular and a periphery of said gate is generally circular with a radius greater than a radius of said hole in said base.

5. The valve assembly as recited in claim 1, wherein said base comprises a retaining lip on said one side thereof, and said cap comprises a distal rim portion disposed within a perimeter established by said retaining lip and engaging said base.

6. The valve assembly as recited in claim 1, wherein said base comprises a valve seat projecting from a periphery of said hole in said base, said contact surface of said base being on a distal end of said valve seat.

7. The valve assembly as recited in claim 1, wherein said valve further comprises a beveled surface disposed on a periphery of said opening in said cap.

8. A bag comprising a wall and a valve assembly as recited in claim 1, valve assembly being attached to and penetrating said bag well with said gate being disposed in the interior of said bag and said cap being disposed on the exterior of said bag.

9. A valve assembly comprising a base and a deformable valve coupled to said base, wherein said base comprises a throughhole, said valve comprising a support structure comprising a port and a distal rim portion that contacts one side of said base along a first seal contact line that surrounds one end of said hole in said base, a gate having a peripheral portion that contacts another side of said base along a second seal line that surrounds the other end of said hole in said base, and a stem connecting said support structure to said gate and passing through said hole in said base, said stem comprising a wall forming an internal cavity in fluid communication with said port and a first opening that passes through said wall and is in fluid communication with said cavity, wherein said support structure of said valve is deformable to allow said gate to displace from a first position in contact with said base along said second seal line to a second position at least partially disengaged from said base, whereby air in a space adjacent said other side of said base can be induced by the application of a relatively lower pressure at said port to flow through said first opening, through said cavity and out said port.

10. The valve assembly as recited in claim 9, wherein said support structure and one end of said stem are integrally formed.

11. The valve assembly as recited in claim 9, wherein said support structure is dome-shaped and said stem depends downward from a periphery of said port on a concave side of said support structure.

12. The valve assembly as recited in claim 9, wherein stem further comprises a second opening that passes through said wall and is in fluid communication with said cavity.

13. The valve assembly as recited in claim 9, wherein said stem comprises a neck that is integrally formed with or joined to a portion of said gate.

14. A bag comprising a wall and a valve assembly as recited in claim 9, said base of said valve assembly being attached to said bag well, said gate being disposed in the interior of said bag and said support structure being disposed on the exterior of said bag.

15. A valve assembly comprising:
  a base having top and bottom surfaces and a hole extending through said base from said top surface to said bottom surface; and
  a valve comprising:
    a resilient dome-shaped cap that is open at the top, said cap comprising a distal rim portion that bears against said top surface of said base;
    a gate seated against said bottom surface of said base and closing said hole in said base in a first valve state; and
    a stem connecting said gate to said cap, said stem comprising a wall that forms a cavity that is in fluid communication with said opening in said cap, said wall comprising at least one opening that passes therethrough, said cavity being in fluid communication, via said opening in said wall, with a first volume bounded by said gate, said base, said cap and said stem,
    wherein said cap is deformable when pressed with sufficient force in an axial direction to adopt a second valve state, deformation of said cap causing said gate to separate from said bottom surface in said second valve state, thereby allowing fluid communication between said first volume and a second volume under said base.

16. The valve assembly as recited in claim 15, wherein said base comprises a retaining lip on said top surface thereof, and said cap comprises a distal rim portion disposed within a perimeter established by said retaining lip and engaging said top surface.

17. The valve assembly as recited in claim 15, wherein said stem comprises a neck that is integrally formed with or joined to a portion of said gate.

18. The valve assembly as recited in claim 15, wherein said base comprises a seat that projects downward along a periphery of said hole, said bottom surface being formed on said seat, and said gate being in contact with said seat in said first valve state.

19. A bag comprising a wall and a valve assembly as recited in claim 15, said base of said valve assembly being attached to said bag well, said gate being disposed in the interior of said bag and said support structure being disposed on the exterior of said bag.

20. A reclosable bag comprising:
  a receptacle having an interior and a mouth for providing access to said interior;
  a zipper comprising first and second zipper parts joined to said mouth in mutually opposing positions, said first and second zipper parts being mutually interlockable for closing said mouth; and
  a valve assembly disposed in an opening in a wall of said receptacle, said valve assembly comprising:
    a base joined to a portion of said wall along a periphery of said opening in said wall, said base comprising a first surface facing the exterior of said receptacle, a second surface facing the interior of said receptacle and a hole extending through said base from said first surface to said second surface, said hole in said base overlapping said opening in said wall; and
    a valve mounted to said base and comprising a deformable support structure disposed outside said receptacle and comprising a port, a gate disposed in said interior of said receptacle, and a stem depending from said deformable support structure, said gate being joined to or integrally formed with a distal end of said stem, wherein said stem comprises a wall that forms a cavity in fluid communication with said port, said wall comprising an opening in fluid communication with said cavity and a volume bounded by said base, said gate, said stem and said deformable support structure, said gate being seated against second surface of said base to close said hole in said base in a first valve state and being displaced to separate from said second surface when said support structure is pressed with sufficient force in an axial direction in a second valve state, said interior of said receptacle being in fluid communication with said port via said hole in said base, said volume, said opening in said wall of said stem and said cavity in said second valve state.

21. The bag as recited in claim 20, wherein said deformable support structure comprises a dome-shaped cap.

* * * * *

UNITED STATES PATENT AND TRADEMARK OFFICE
CERTIFICATE OF CORRECTION

PATENT NO. : 6,634,384 B2  
DATED : October 21, 2003  
INVENTOR(S) : Janet L. Skeens and Gerald W. Sweeney It is certified that error appears in the above-identified patent and that said Letters Patent is hereby corrected as shown below:

Column 4,
Line 62, "well" should read -- wall --

Column 5,
Line 34, "well" should read -- wall --

Column 6,
Line 17, "well" should read -- wall --

Signed and Sealed this

Eighteenth Day of May, 2004

JON W. DUDAS
*Acting Director of the United States Patent and Trademark Office*